United States Patent Office 2,815,071
Patented Dec. 3, 1957

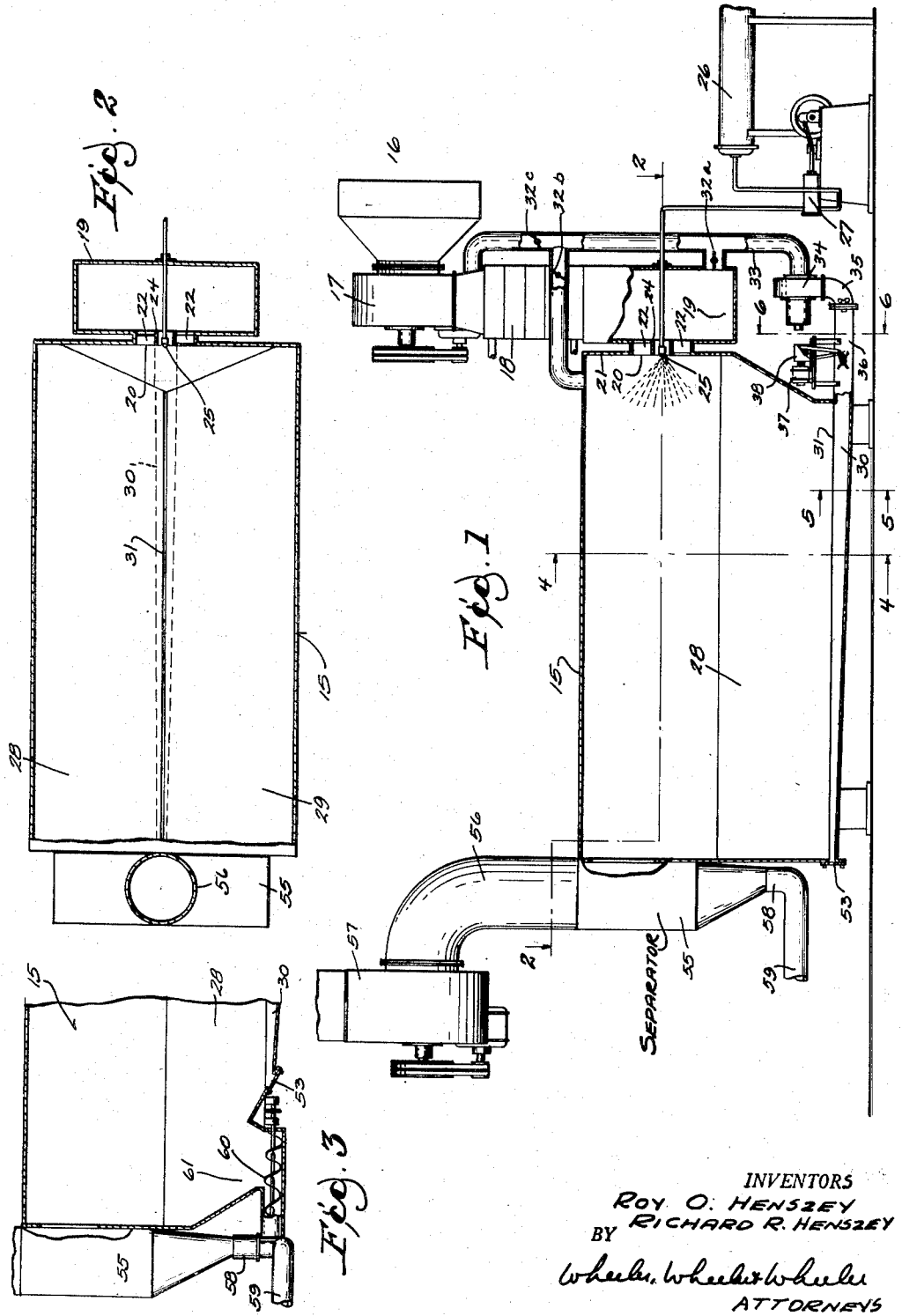

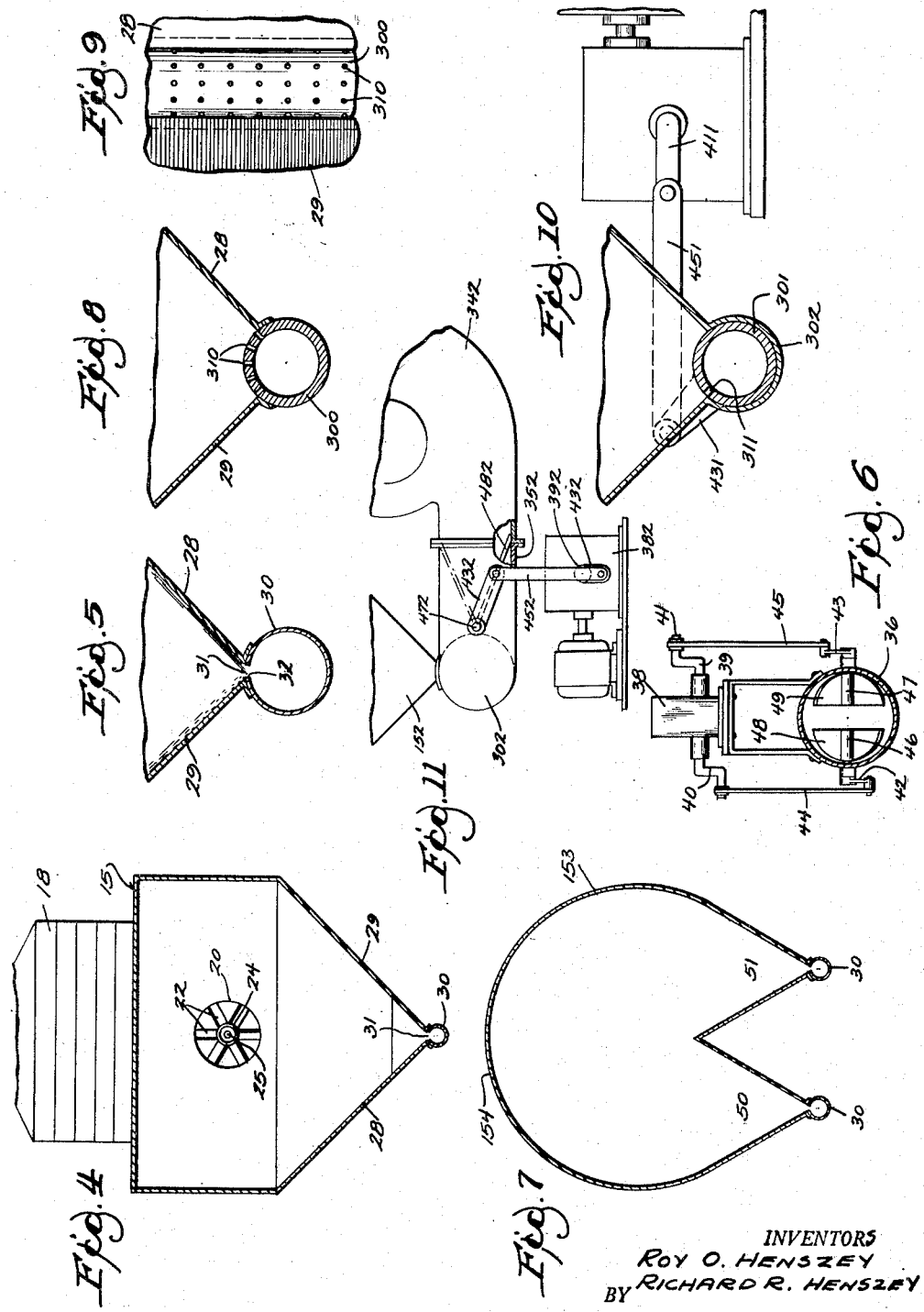

2,815,071
HORIZONTAL SPRAY DRIER

Roy O. Henszey, Oconomowoc, and Richard R. Henszey, Watertown, Wis.

Application September 18, 1953, Serial No. 380,904

19 Claims. (Cl. 159—4)

This invention relates to a horizontal spray drier with means for maintaining particles in suspension during their dehydration.

It is easy in a vertical chamber spray drier to maintain the particles in suspension for a limited period until their exit from the chamber but such spray driers require excessive building height for their accommodation. Our novel device maintains the particles in suspension about forty percent longer than in any previous horizontal drier known to us. This result is accomplished in a horizontal chamber of such dimensions as to be readily incorporated on one floor of a building and of such construction that large capacity chambers can be preassembled and readily shipped using standard railroad equipment. In addition to the heated air which enters the drying chamber together with the spray of material to be dehydrated, our novel device introduces one or more jets or sheets of air through slots or apertures at the bottom apex of the V-shaped trough comprising the bottom of the chamber, such jets either being permanently directed or preferably moved from side to side to scour the convergent bottom surfaces and to provide an upward blast between such surfaces, whereby particles (usually the larger sizes) which are insufficiently dried and which would otherwise fall to the bottom of the chamber are maintained in suspension until dehydration is sufficient. As distinguished from conventional driers in which the particles give off moisture which remains in the concurrent air surrounding the particle, the upward blast in our novel drier causes a thorough mixing and a change of air around these particles.

By this means, the heavier as well as the lighter particles of dehydrated material are entrained with the air when it passes from the dehydrating chamber. All such sprayed particles, regardless of weight, are maintained in suspension for a sufficient period to complete dehydration to the desired degree, it being understood that even after the material is reduced to powder form, there usually remains a considerable water content which must be removed before dehydration will have been completed to the required value of about 2 to 3.5 percent water.

Although it is unnecessary for most purposes, we may provide a special screw or other mechanical conveyor for removing particles which may be allowed to fall out of suspension at the outlet. These are usually remixed with pneumatically discharged powder when the latter is separated from the pneumatic current.

The chamber desirably has at least one trough extending longitudinally of its bottom and to which chamber walls are downwardly convergent. At or near the line upon which such walls would intersect we provide an air blast pipe with upwardly directed discharge ports arranged to sweep the walls either by reason of the position of such ports in a stationary pipe by the bodily oscillation of the pipe or preferably by means of a vortex current of air produced in the pipe. In any case, the device dispenses completely with scrapers and other like apparatuses used in prior art horizontal spray driers. Regardless of the means employed for establishing upward currents within the V-shaped bottom, material is precluded from lodging in the bottom where it would be heated without full opportunity for dehydration.

According to our improved method, the material to be spray dried is entrained in a current of air of generally horizontal direction and is subjected repeatedly to upward blasts from an auxiliary source of gas whereby uniformity of dehydrating is promoted, regardless of particle size, by maintaining the heavier particles in suspension along with the lighter particles, and by changing the air to which the particles are exposed until dehydration is substantially complete.

In the drawings:

Fig. 1 is a view partially in side elevation and partially in vertical axial section through a horizontal spray drier embodying the invention.

Fig. 2 is a view taken in section on line 2—2 of Fig. 1.

Fig. 3 is a view like Fig. 1 fragmentarily illustrating a modified embodiment.

Fig. 4 is a view taken in section on line 4—4 of Fig. 1.

Fig. 5 is a greatly enlarged detail view taken in section on line 5—5 of Fig. 1.

Fig. 6 is an enlarged detail view taken in section on the line 6—6 of Fig. 1.

Fig. 7 is a view in transverse section through a spray drying chamber of enlarged capacity having a double trough bottom and illustrating a modified embodiment of the invention.

Fig. 8 is a view similar to Fig. 5 showing a modified air blast arrangement.

Fig. 9 is a fragmentary detail view in plan of portions of the device shown in Fig. 8.

Fig. 10 is a view similar to Figs. 5 and 8 showing a further modified embodiment of the invention.

Fig. 11 is a fragmentary detailed view looking in end elevation at the end of the blast tube and the pressure connection thereto showing a further modified embodiment of the invention.

In the preferred construction shown in Figs. 1, 2, and 4–6, the dehydrating chamber 15 has its greatest length extending horizontally. Air is passed through a filter at 16 and admitted to blower 17 which propels it through a heater 18 into a plenum chamber 19. The temperature of the air may be raised to any appropirate value. In practice it is usually between 275° F. and 375° F.

A throat 20 opens from the plenum chamber 19 through the end wall 21 of dehydrating chamber 15. Desirably, but not necessarily, we employ turbine blades 22 in this throat so that a vortex is established as the air passes the blades in entering the dehydrating chamber. A nozzle 25 or other atomizing device is supported centrally in the throat 20, and may be disposed within a ring 24 to which the inner ends of blades 22 are connected.

The milk or other liquid to be spray dried is delivered to the nozzle 25 from a pre-heater 26 which may raise its temperature to any appropriate degree (usually about 160° F.). The pump 27 advances the milk under a pressure which may be of the general order of 2500 pounds per square inch so that when the spray is discharged from nozzle 25 in the form of a rapidly expanded cone of atomized liquid it will immediately lose most of its water to the stream of hot air entering through the throat 20. The remaining solids are promptly reduced to a powder. The powder and the air are reduced in temperature by evaporation of the moisture content to about 180° F., but even at this reduced temperature evaporation of water from entrained finely divided particles continues until these are reduced to a water content which, in the case of powdered milk, should be as low as 3.5% water.

Thus far the apparatus is quite largely conventional.

In accordance with the present invention, the material is pneumatically conveyed, as well as dehydrated, by the current of drying gas (air). Relatively heavy powdered material which settles out of the main dehydrating gas current in the upper part of the chamber and falls toward the lower apex of the trough formed by the convergent walls 28 and 29, is subjected to an air blast or air blasts tending to return such particles upwardly into the dehydrating current. In the preferred embodiment of the invention, blast pipe 30 has an upwardly directed discharge slot 31 adjacent which the margins 32 of pipe 30 desirably do not extend across the projected planes of the respective convergent trough surfaces 28 and 29, as best shown in Fig. 5. Means is provided whereby air under pressure is supplied to pipe 30 and the resulting blast or jet issuing as a sheet through slot 31 is caused to move from side to side across the trough to sweep upwardly from the side walls 28 and 29, and all intervening portions of the trough, any particles tending to settle into the trough from the main stream of dehydrating gases. Pipe 30 may be of gradually tapering cross section to maintain velocity of discharge, if desired. If, notwithstanding the blast, any material tends to accumulate on the downwardly convergent walls 28 and 29 at the bottom of the dehydrating chamber, this tendency is overcome either by reason of the steepness of inclination of such walls or by the mechanical vibration thereof for perhaps five or six seconds per minute in a manner known to the art.

In the preferred construction shown in Figs. 1 and 2, the air supplied to the blast pipe 30 may be taken by pipe 33 under super atmospheric pressure either from the plenum chamber 19, wherein the air is heated, but dry; from the drying chamber 15, wherein the air is warm but slightly moist; or from the inlet fan discharge throat, wherein the air is at atmospheric temperature and humidity. Dampers 32a, 32b and 32c control these several connections so that air can be led to blower 34 in desired quantities from any one or more of these sources.

Blower 34 is connected by elbow 35 with a section of pipe 36 which is equipped with vanes shown in detail in Fig. 6 and which leads to the blast pipe 30. The motor 37 drives through gear box 38 a crank shaft 39 having opposed cranks at 40 and 41 which are of short radius as compared with the cranks 42, 43 with which cranks 40 and 41 are respectively connected by connecting rods 44 and 45. Cranks 42 and 43 are thereby caused to oscillate the rock shafts 46 and 47 with which they are respectively connected. Within pipe section 36 these rock shafts carry vanes 48 and 49 which are respectively movable in opposite directions through horizontal positions between positions of mutually opposite inclination, as shown in dotted lines in Fig. 1.

It is the purpose of the vanes 48 and 49 to cause the air blown through blast pipe 30 to rotate alternately clockwise and counterclockwise, according to the pitch of the vanes. Either one of the vanes alone would produce the desired direction of rotation but the air is directed more positively in the desired path of vortex movement when two opposed vanes are employed as shown. The disclosed arrangement is preferred even though it is recognized that other means of producing vortex movement are available.

As a result of this alternate clockwise and counterclockwise rotation as viewed in Figs. 5 and 6, a whirling current of air is produced within the blast tube 30 which tends to issue tangentially therefrom through the slot 31 when the blades are in their extreme positions and the vortex has maximum angular velocity. As a result, when the vortex is rotating clockwise, as viewed in Fig. 5, the resulting jet will sweep up the interior surface of wall 28. As the angular velocity of the air in blast pipe 30 decreases, due to the vanes 48 and 49 approaching their horizontal intermediate positions, the blast becomes less sharply tangent and finally swings away from wall 28 across the center of the trough until, with reversal of the vanes, the counterclockwise rotation in blast pipe 30 directs the jet through slot 31 toward, and finally along the inner surface of, wall 29.

It will, of course, be understood that the crank means for mechanically oscillating vanes 48 and 49 is merely by way of exemplification and has no particular advantage over solenoid or hydraulic or pneumatic means, or other means of shifting the vanes.

In this manner, without any moving part exposed to contact with the dehydrated material, the material is restored to the main dehydrating current by an air blast which is not only upwardly directed but preferably comprises fresh dehydrating gases taken partly from the inlet fan discharge and partly from plenum chamber 19, the mixture having a temperature of possibly 200° F. and minimum moisture content. Thereby these heavier particles are given a greater degree of dehydrating treatment than that received by the lighter and more completely dried material which remains entrained in the original stream of dehydrating gases. The treatment given the heavier particles is much greater than they would have if they were not re-elevated, or were exposed only to air already burdened with moisture, or remained on the bottom, covered with other material or were scraped up or conveyed in a mass with other material. In this device, the heavier the particles, and the more often they tend to fall into the trough in the bottom of the chamber, the greater will be the duration and effectiveness of the supplementary dehydrating action. In consequence, there will be a strong tendency for all particles to be dried more uniformly, regardless of their initial size and weight. Most of the smaller particles, when they are sufficiently dried, will remain entrained and will not get so much of this secondary dehydrating treatment as do the heavier particles falling into the zone of the supplemental dehydrating blast.

It is not necessary that the blast pipe 30 have a single discharge opening in the form of a slot. It may, instead, be provided with a series of small ports. This is exemplified in Fig. 8 where the number and radial direction of such ports in the blast pipe 300 is such that the ports 310 extend not only vertically but at various angles to intercept and blast upwardly particles which are tending to fall in any portion of the trough. Where this arrangement is used, a greater portion of the blast pipe may be exposed within the trough than was the case in the construction of Fig. 5. The use of the oscillating vanes 48 and 49 is, of course, made unnecessary by the arrangement shown in Figs. 8 and 9 but the amount of air required to be delivered through the blast pipe will be greater.

Fig. 10 shows an alternative arrangement in which the blast pipe 301 is mounted for oscillation in a complementary bearing provided at 302 in the bottom of the trough, its opening or openings at 311 being swung from side to side by the bodily oscillation of the blast pipe. This is effected by connecting the blast pipe crank 431 by means of connecting rod 451 with a motor driven crank 411. As shown, the blast opening 311 is directed up the side wall 29 of the trough. It will be evident that in the other extreme position of oscillation of the pipe 301, its jet opening 311 will be directed up the inner surface of the side wall 28. Thus in the to and fro oscillation of the pipe, the jet of gas issuing from its discharge port or ports 311 will sweep the trough from side to side, deflecting upwardly all of the particles tending to settle therein, in much the same fashion as does the laterally oscillating jet produced by the reversal of direction of whirling motion of the air current of blast pipe 30 in Fig. 5 and Fig. 6. The air mixes, dehydrates, suspends and conveys the particles on which it acts.

Fig. 11 shows a further modified embodiment. The relation of the blast tube 302 to the drying chamber 152 is identical with that shown in Figs. 1 and 5, but a different arrangement is used for producing the opposite rotation of the vortex in the blast tube. To this end, the air supplied by the blower 342 is led to the blast tube 302 through a transverse pipe 352 which may desirably, though not necessarily, be of rectangular cross section. Disposed in this pipe for oscillation with a rock shaft 472 is a damper 482 movable between the positions shown in full and dashed lines in Fig. 11. The rock shaft is located substantially in line with the periphery of the blast tube to direct air from the blower tangentially into one side or the other of the blast tube, according to the position of the damper for whirling movement either clockwise or counterclockwise. As illustrated, the flow will be counterclockwise.

For oscillating the damper periodically, I may provide the rock shaft 472 with an arm 432 connected by a link 452 with a crank 432 on the armature shaft 392 of motor 382.

Fig. 7 differs from the constructions previously described only in the form of the dehydrating chamber 153 which has an upwardly convex top wall 154 and a pair of bottom troughs 50 and 51, each of which corresponds in a general way with the single bottom trough shown in Fig. 4, it being understood that any of the arrangements shown in Figs. 5 to 10 can be used for producing upward blasts from the blast pipe 30 at the bottom of the respective troughs 50 and 51.

In all the devices herein disclosed, the blast pipe 30 is readily accessible for cleaning, desirably being provided with removable closures at both ends as exemplified by a removable closure 53 at its smaller end (Fig. 1) and the elbow 35 on pipe section 36 at its larger end. Either or both are removable so that a brush may readily be pulled through the blast pipe for cleaning. Ordinarily there can be no accumulations of solid material in the blast pipe, since it is supplied with rapidly moving air during operation of the machine, which precludes any of the dehydrating material from penetrating the ports. The air used is derived from a filtered source.

At the end of the dehydrating chamber 15, which is remote from its inlet throat 20, is a separator 55 which may comprise either the well known cyclone or the equally well known bag type of separator from which an air exhaust pipe 56 leads to an exhaust fan 57. Solids separated from the air are discharged through spout 58 to a conveyor 59.

Optionally I may use the structure of Fig. 3 whereby heavier solids which are not entrained in the air current leaving chamber 15 may be delivered by screw conveyor 60. A hopper 61 which is very short as compared with the total length of dehydrating chamber 15 can be provided near the discharge end of such chamber and beyond that portion of the chamber to which the blast of gas is provided by the blast pipe 30. Even the heaviest particles will ordinarily be sufficiently dry before they reach this end of the chamber, having been rapidly thrown aloft by gases supplied through the blast pipe, and having been sufficiently dehydrated by repeated exposure to such gases. However, in unusual conditions there may be some particles too heavy to be entrained by the air leaving the chamber, and in such cases these may be accumulated in the hopper 61 and delivered by the screw 60 into spout 58 where they may be re-mixed with the finer material which was originally entrained but has been separated from the pneumatic current in the separator 55.

It will be understood that the use of the hopper 61 and screw 60 is optional. Ordinarily the air from the blast tube 30 is entirely adequate to maintain even the heaviest particles in suspension, and has done so up to this point. It is a feature of the present device that the dehydrating current is also a conveying means to which the heavier particles are returned by the air from the blast tube in the normally intended operation.

While the method of operation will be apparent from the preceding description of the apparatus, it may be summarized as follows, it being understood that the figures used are merely by way of exemplification.

Air which is filtered and heated to temperatures of the general order of 325° F. is blown longitudinally of a horizontal dehydrating chamber and is desirably, though not necessarily, delivered into such chamber in the form of a vortex, axially of it, or longitudinally of the air stream and the chamber. The milk or other liquid to be dried is discharged, preferably in a conical spray which spreads across the path of the air. The said liquid is desirably at a temperature of about 160° F. and a pressure of the general order of 2500 pounds per square inch when discharged from nozzle 25, but sufficient evaporation occurs immediately upon admission to the chamber to reduce the material to a powder and to cool the mixture of powder and air to approximately 180° F. The length of travel or time of suspension of the powder with the dehydrating current should be sufficient to complete dehydration to approximately 3.5% moisture, more or less, depending on the product and the end result desired.

Even the heaviest particles of the sprayed material if dried to powder while in suspension are then maintained in suspension by an air blast admitted through the bottom of the dehydrating chamber and made to move from side to side. This blast not only maintains the material in suspension in the dehydrating current but, by reason of its direction transverse to such current, the air blast creates a very high degree of turbulence which markedly facilitates the drying operation. It also decreases any tendency of the material to lodge upon wall surfaces of the dehydrating chamber and sweeps the inclined bottom surfaces on which material would otherwise have the greatest tendency to lodge. Thus the interior bottom surface of the chamber is kept clean without scraping; the material to be dehydrated is given approximately uniform dehydrating exposure regardless of relative weight of the particles, and the exposure of the material to heat is limited to the time actually used for dehydration. If the material were permitted to lodge, it would leave substantial portions of the material exposed to heat without being correspondingly exposed to moving air currents for dehydration. The air currents would reach only particles at the surface of the layer of lodged powder.

Finally, we may optionally prolong the path of dehydrating current, prior to separation of the light powder therefrom, and beyond the range of the blast currents above referred to for a distance sufficient to permit heavier particles to fall into a hopper leading to a separate discharge opening. For the particular purposes of this present device, we prefer to return these heavier particles to admixture with the lighter particles, but it will be obvious that this need not be done. If the hopper and conveyor are used at all, the heavier particles may issue from a separate outlet and can be kept separate from the lighter particles if there is any advantage in so doing.

The air blast which maintains the heavier particles in suspension throughout that portion of the length of the dehydrating chamber in which the air blast is supplied, is desirably heated to the highest practical temperature that will not injure the product (about 350° F. for milk or wet surface particles or 200–220° for milk in powdered form). It is desirably a dry gas so that it supplies to the heavier particles the additional measure of dehydration which they require by reason of their greater water content in relation to their surface. The rapid evaporation which occurs in consequence of the blast arrangement makes more effective use of the dehydrating gases and more rapidly lowers the temperature of the gases and the product, this being a great advantage in the case of a product which is susceptible to damage if maintained for too long a period at unduly elevated temperatures.

A particular feature of the method is the use of a reversing vortex in the blast tube to provide change of direction of the air blast issuing through the slotted wall of such tube for sweeping the sides of the V-bottom or trough portion of the dehydrating chamber and for creating a blast which swings from side to side in such chamber.

The apparatus and method disclosed permit the dehydrating operation to be conducted on a single floor of a factory with normal ceiling heights, instead of requiring 30 or 40 feet of height, as would generally be necessary in a vertical spray drier. The method and apparatus give increased efficiency, decreased exposure of the product to heat, a greater uniformity and better quantity of product and a minimum of unsanitary and costly parts used for scraping or otherwise dislodging and conveying material from the chamber.

We claim:

1. A spray drier comprising a dehydrating chamber of generally horizontal elongation having longitudinally spaced inlet and outlet ports and side walls defining a path of flow between said ports, means for inducing flow of a current of dehydrating gas through the chamber between said ports, means for delivering a material to be dehydrated into such current for passage therewith through a part of the chamber, a blast conduit extending for at least a substantial portion of the length of the bottom of the chamber and, having means placing it in communication with the chamber for a substantial portion of its length, means for delivering gas under pressure through said conduit for establishing an upward blast of such gas in the chamber to maintain the said material in suspension in the current of dehydrating gas for a substantial portion of such passage, and means operatively associated with the blast conduit for causing the blast issuing therefrom to swing from side to side of said chamber across the flow of material traversing the chamber between said ports.

2. The device of claim 1 in which the conduit comprises a tube longitudinally slotted for communication with the chamber and in further combination with means for establishing a vortex in the tube for tangential delivery into the chamber, the chamber having a bottom wall sloping toward the tube and along which said tangential delivery occurs.

3. The device of claim 1 in which the chamber comprises a trough extending along its bottom and having walls downwardly convergent, said blast conduit being located adjacent the line to which said walls converge, the means affording communication between the blast conduit and the chamber extending along said line.

4. The device of claim 3 in which said blast conduit comprises a tube connected with said convergent walls and ported between said walls to provide the said means of communication with said chamber, the means for causing the upward blast issuing from the ported tube to swing from side to side in said chamber having sufficient range to cause said blast to be directed first generally along one trough wall and then generally along the other trough wall.

5. The device of claim 4 in which the connection of the tube with the said walls comprises a bearing support in which the tube is oscillatable, the ported portion of the tube projecting into the chamber sufficiently to direct from side to side the blast issuing therefrom in accordance with the oscillatory position of the tube.

6. A spray drier comprising a dehydrating chamber of generally horizontal elongation having longitudinally spaced inlet and outlet ports, means for inducing flow of a current of dehydrating gas through the chamber between said ports, means for delivering a material to be dehydrated into such current for passage therewith through a part of the chamber, a blast conduit extending for at least a substantial portion of the length of the bottom of the chamber and, having means placing it in communication with the chamber, and means for delivering gas under pressure through said conduit for establishing an upward blast of such gas in the chamber to maintain the said material in suspension in the current of dehydrating gas for a substantial portion of such passage, the said conduit comprising a tube provided with means for establishing a whirling flow of gases traversing the tube whereby said gases will issue tangentially through the port means of the tube, and means for reversing the direction of whirling movement of such gases in the tube whereby the blast issuing from the port means will change direction in the chamber to sweep from side to side thereof.

7. The device of claim 6 in which the means for reversing the direction of whirling movement of the gases comprises a rock shaft extending transversely of the tube and on which a vane is mounted in the path of gases traversing the tube for oscillation between positions of opposite inclination relative to the axis of the tube.

8. A spray drier comprising an elongated chamber having longitudinally spaced material spray and material outlet means and a bottom which includes downwardly convergent walls constituting a trough extending longitudinally of the chamber, a blast tube toward which said walls are convergent and to which said walls are connected, said tube having port means placing it in communication with said chamber between said walls, means for establishing a dehydrating current longitudinally of the chamber, means for supplying dehydrating gas to said tube for discharge of blasts of such gas through said port means upwardly into said chamber and transversely of said current and means operatively associated with said tube for causing such upward blasts to swing from side to side transversely of the flow of material from the spraying means to the outlet means and across said chamber to direct said blasts first generally along one of said walls and then generally along the other of said walls.

9. The device of claim 8 in which said last means comprises a pair of vanes in said tube in the path of said gas supplied thereto, rock shafts on which the vanes are mounted for oscillation between positions of opposite inclination relative to the axis of the tube and means for oscillating said shafts in opposite directions to reverse the pitch of the respective vanes while maintaining the vanes at opposite pitch with respect to each other, the said shafts being disposed on axes transverse respecting the blast tube and the vanes having a general direction axial with respect to the tube and being normally disposed at an angle to a plane common to said shafts and the tube axis.

10. The device of claim 9 in which the respective rock shafts have cranks and in further combination with a motor driven crank shaft having connecting rods extending to the cranks aforesaid, the crank throw of the crank shaft being sufficiently shorter than the cranks of the respective rock shafts to effect oscillation of the rock shafts in the rotation of the crank shaft.

11. The device of claim 8 in which the tube is provided with a bearing in which it is oscillatable and which connects the tube with said walls, said tube being exposed to said chamber between said walls and the port means being disposed in a limited portion of the area of the tube so exposed, and means for oscillating said tube to swing the port means from a first position of proximity to one of said walls to a second position in which the port means is proximate to the other of said walls, 12. In a spray drier of the type having a horizontally elongated dehydrating chamber with means for supplying dehydrating gases thereto, and means spaced longitudinally of the chamber from the gas supplying means for exhausting dehydrating gases therefrom, and means for spraying into the resulting current of such gases a supply of liquid to be dehydrated, the combination of such a chamber providing a path of flow for such gases and liquid which path is sufficiently elongated so that heavy particles tend to settle from such a current, said chamber having a longitudinally extending trough shaped bottom having longitudinally elongated downwardly converging sides and port means in its lowest portion, a blast pipe having connections through said port means with said chamber and arranged for delivery of upward blasts in such chamber upwardly long the sides of the trough shaped bottom and across the dehydrating current established in the chamber, and means for supplying dehydrating gas to said blast pipe, the resulting blast in said chamber tending to scour such sides and to maintain particles in suspension and to create turbulence and to provide supplemental dehydration for particles sufficiently heavy to settle toward the bottom of said chamber.

13. The device of claim 12 in which the means for supplying dehydrating gas to said pipe has a connection to receive a portion of the dehydrating gas prepared for admission through the inlet port of said chamber.

14. The device of claim 12 in further combination with a plenum chamber connected with the inlet of the dehydrating chamber, the means for supplying dehydrating gas to the blast pipe including a branch from the plenum chamber having a gas circulator therein.

15. The device of claim 12 in which the port means through which the blast pipe communicates with the dehydrating chamber extend for only a portion of the length of such chamber, the trough shaped bottom of said chamber being provided beyond said port means with a hopper into which heavier components of dehydrated material are received, and means for discharging from said hopper the material received therein.

16. A method of dehydration which consists in establishing a generally horizontal current of dehydrating gas, delivering into said current material to be dehydrated and in sufficiently fine particles to be generally entrained in said current, establishing an upward blast of dehydrating gas beneath said current and intercepting said current, for restoring to entrainment therein particles which tend to settle from said current, and moving said upward blast intermittently from side to side during passage of the horizontal current and in a direction transverse to said current.

17. The method recited in claim 16 in which the upward blast is established by rotating supplemental dehydrating gas in a vortex having its axis extending in the same general direction as said current and discharging such gas tangentially from the vortex, the movement of such blast being effected by reversing the direction of vortex rotation.

18. In a spray drier, the combination with a dehydrating chamber and means for establishing a current of dehydrating gas horizontally across the chamber, of means for introducing a blast of gas upwardly in the chamber for establishing turbulence and maintaining particles in suspension in said current, said blast means comprising a blast tube having an axially slotted wall providing communication with the chamber, means for supplying gas under pressure to the tube and means including an oscillatable vane movable between positions of opposite inclination respecting the tube axis and disposed in the path of the gas traversing the tube for causing the gas to move with a whirling motion of reversible direction through the tube for tangential discharge in one direction and the other into said chamber.

19. The device of claim 18 in which the means of supplying air to the tube comprises a coupling connection opening laterally into the tube and in which said vane is disposed, said vane having fulcrum means adjacent the point of communication of the coupling with the tube and having a free end portion projecting from said coupling against the flow of gas to substantially engage opposite wall portions of the coupling at a point remote from the tube, whereby to constitute a damper for deflecting such gas in opposite directions about the tube as the damper is oscillated, together with means for the oscillation of the damper.

References Cited in the file of this patent

UNITED STATES PATENTS

| | | |
|---|---|---|
| 860,929 | Merrell | July 23, 1907 |
| 878,977 | Merrell | Feb. 11, 1908 |
| 1,321,362 | Carr | Nov. 11, 1919 |
| 1,497,201 | Wheat | June 10, 1924 |
| 1,829,139 | Henderson | Oct. 27, 1931 |
| 1,851,807 | Burton | Mar. 29, 1932 |
| 1,866,769 | Harris | July 12, 1932 |
| 2,456,674 | Caughey | Dec. 21, 1948 |

FOREIGN PATENTS

| | | |
|---|---|---|
| 13,186 | Great Britain | of 1904 |
| 663,121 | Great Britain | Dec. 19, 1951 |
| 680,053 | Great Britain | Oct. 1, 1952 |
| 95,364 | Switzerland | July 1, 1922 |
| 668,998 | Germany | July 14, 1936 |